US011832167B2

(12) United States Patent
Chu et al.

(10) Patent No.: US 11,832,167 B2
(45) Date of Patent: Nov. 28, 2023

(54) METHOD AND APPARATUS FOR WIRELESS OPERATIONS

(71) Applicant: NXP USA, Inc., Austin, TX (US)

(72) Inventors: Liwen Chu, San Ramon, CA (US); Young Hoon Kwon, Laguna Niguel, CA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 61 days.

(21) Appl. No.: 17/376,057

(22) Filed: Jul. 14, 2021

(65) Prior Publication Data

US 2022/0022127 A1 Jan. 20, 2022

Related U.S. Application Data

(60) Provisional application No. 63/055,271, filed on Jul. 22, 2020, provisional application No. 63/051,700, filed on Jul. 14, 2020.

(51) Int. Cl.
*H04W 48/16* (2009.01)
(52) U.S. Cl.
CPC .................. *H04W 48/16* (2013.01)
(58) Field of Classification Search
None
See application file for complete search history.

(56) References Cited

U.S. PATENT DOCUMENTS

| 2011/0222520 | A1* | 9/2011 | Montemurro | H04W 28/24 370/338 |
| 2015/0237654 | A1* | 8/2015 | Park | H04W 74/0816 370/329 |
| 2021/0050999 | A1* | 2/2021 | Huang | H04L 9/3242 |
| 2021/0297184 | A1* | 9/2021 | Huang | H04L 1/1896 |
| 2021/0329500 | A1* | 10/2021 | Cariou | H04W 80/02 |

OTHER PUBLICATIONS

Park, Minyoung et al. "Enhanced Multi-Link Single Radio Operation", doc.: IEEE 802.11-20/0562r0, Apr. 2020, 12 pgs.

* cited by examiner

*Primary Examiner* — German Viana Di Prisco

(57) ABSTRACT

Embodiments of a method and an apparatus for wireless operations are disclosed. In an embodiment, a method for wireless operations involves a first wireless device transmitting to a second wireless device, a management frame having a multi-link device (MLD) level Quality of Service Management Frame (QMF) Policy field that identifies an MLD level QMF Policy and a link level QMF Policy field that identifies a link level QMF Policy for a corresponding link, where the MLD level QMF Policy indicates an Access Category (AC) for each MLD level QMF management frame and each link level QMF Policy field indicates the AC for each link level QMF management frame, receiving, at the second wireless device, the management frame with the MLD level QMF Policy field and link level QMF Policy field for each corresponding link, and operating the second wireless device according to the AC indicated by the first wireless device.

16 Claims, 6 Drawing Sheets

| CATEGORY 402 | PUBLIC ACTION 404 | DIALOG TOKEN 406 | STATUS CODE 408 | QMF POLICY ELEMENT (OPTIONAL) 410 | ML ELEMENT (OPTIONAL) 412 |
|---|---|---|---|---|---|
| 1 | 1 | 1 | 2 | 0 OR 3-257 | |

OCTETS:

| CATEGORY 502 | PUBLIC ACTION 504 | DIALOG TOKEN 506 | QMF POLICY ELEMENT 510 | ML ELEMENT (OPTIONAL) 512 |
|---|---|---|---|---|
| 1 | 1 | 1 | 3-257 | |

OCTETS:

METHOD AND APPARATUS FOR WIRELESS OPERATIONS

CROSS-REFERENCE TO RELATED APPLICATIONS

This application is entitled to the benefit of U.S. Provisional Patent Application Ser. No. 63/051,700, filed on Jul. 14, 2020, and U.S. Provisional Patent Application Ser. No. 63/055,271, filed on Jul. 22, 2020, each of which is incorporated by reference herein.

BACKGROUND

In wireless communications, wireless devices, e.g., access point (AP) multi-link devices (MLDs) or non-AP MLDs, e.g., STA multi-link devices (STA MLDs), can execute various wireless operations, such as announcements of some features or operations for devices in a multi-link operation via one or more links. As an example, management frames may be transmitted at a link level or an MLD level between a first wireless device (e.g., AP, AP MLD, STA, or STA MLD) and a second wireless device (e.g., AP, AP MLD, STA, or STA MLD). However, because wireless devices may not be able to interpret whether management frames were exchanged at the link level or the MLD level, multi-link operations may not be easily supported by wireless communication systems.

SUMMARY

Embodiments of a method and an apparatus for wireless operations are disclosed. In an embodiment, a method for wireless operations involves transmitting, by a first wireless device to a second wireless device, a management frame having a multi-link device (MLD) level Quality of Service (QoS) Management Frame (QMF) Policy field that identifies an MLD level QMF Policy and a link level QMF Policy field that identifies a link level QMF Policy for a corresponding link, where the MLD level QMF Policy indicates an Access Category (AC) for each MLD level QMF management frame and each link level QMF Policy field indicates the AC for each link level QMF management frame of the corresponding link, receiving, at the second wireless device, the management frame that includes the MLD level QMF Policy field and the link level QMF Policy field for each corresponding link, and operating the second wireless device according to the AC indicated by the first wireless device.

In an embodiment, when the link level QMF Policy is used as a link level policy, the first wireless device is an access point (AP) of an AP MLD and the second wireless device is a station (STA) of an STA MLD.

In an embodiment, when the MLD level QMF Policy is used as an MLD level policy, the first wireless device is an AP MLD with multiple APs and the second wireless device is an STA MLD with multiple STAs.

In an embodiment, a sequence number space for each AC of the link level QMF management frame and a sequence number space for each AC of the MLD level QMF management frame are separately maintained.

In an embodiment, the link level QMF management frame and the MLD level QMF management frame are separately maintained by separating a receive cache of the link level QMF management frame and a receive cache of the MLD level QMF management frame.

In an embodiment, a sequence number space included in the link level QMF management frame and the MLD level QMF management frame for different ACs are sequentially allocated by the first wireless device.

In an embodiment, the first wireless device maintains one sequence number space for the MLD level QMF management frame and the link level QMF management frame of one AC transmitted to the second wireless device at the MLD level.

In an embodiment, the second wireless device maintains a receiver cache of the MLD level QMF management frame and the link level QMF management frame transmitted by the first wireless device.

In an embodiment, the receiver cache is used for duplicate detection.

In an embodiment, during the duplicate detection, if a sequence number and a fragment number of at least one of the MLD level QMF management frame and the link level QMF management frame are less than a recorded sequence number and a recorded fragment number of the AC from the first wireless device in the receiver cache, then at least one of the MLD level QMF management frame and the link level QMF management frame is discarded.

In an embodiment, during the duplicate detection, if a sequence number and a fragment number of at least one of the MLD level QMF management frame and the link level QMF management frame are more than a recorded sequence number and a recorded fragment number of the AC from the first wireless device in the receiver cache, then at least one of the MLD level QMF management frame and the link level QMF management frame is accepted.

In an embodiment, during the duplicate detection, if a sequence number and a fragment number of at least one of the MLD level QMF management frame and the link level QMF management frame of the AC is the same as a recorded sequence number of the AC from the first wireless in the receiver cache and a recorded fragment number of the MLD level QMF management frame and the link level QMF management frame of the AC is more than a recorded fragment number of the AC from the first wireless device in the receiver cache, then at least one of the MLD level QMF management frame and the link level QMF management frame is accepted.

In an embodiment, during the duplicate detection, if a sequence number and a fragment number of at least one of the MLD level QMF management frame and the link level QMF management frame of the AC is more than a recorded sequence number of the AC from the first wireless device in the receiver cache and a fragment number of the MLD level QMF management frame and the link level QMF management frame of the AC is the same as a recorded fragment number of the AC from the first wireless device in the receiver cache, then at least one of the MLD level QMF management frame and the link level QMF management frame is accepted.

In an embodiment, the indicated AC includes an Access Category Index (ACI), and where for each ACI, a replay counter of the link level QMF management frame and a replay counter of the MLD level QMF management frame are separately maintained.

In an embodiment, for each ACI, the first wireless device does not reorder management frames within the replay counter of the MLD level QMF management frame.

In an embodiment, for each ACI, the second wireless device discards management frames with a packet number (PN) that is at least one of less than and equal to the replay counter of the MLD level QMF management frame.

In an embodiment, for each ACI, the first wireless device does not reorder management frames within the replay counter of the link level QMF management frame.

In an embodiment, for each ACI, the second wireless device discards management frames with a PN that is at least one of less than and equal to the replay counter of the link level QMF management frame.

An embodiment of a first wireless device is also disclosed. The first wireless device includes a processor configured to transmit, to a second wireless device, a first management frame having an MLD level QMF Policy field that identifies an MLD level QMF Policy and a link level QMF Policy field that identifies a link level QMF Policy for a corresponding link, where the MLD level QMF Policy indicates an AC for each MLD level QMF management frame and each link level QMF Policy field indicates the AC for each link level QMF management frame of the corresponding link, receive, a second management frame that includes the MLD level QMF Policy field and the link level QMF Policy field for each corresponding link, and operate according to the second AC indicated by the second wireless device.

An embodiment of a wireless system is also disclosed. The wireless system includes a first wireless device configured to transmit a management frame having an MLD level QMF Policy field that identifies an MLD level QMF Policy and a link level QMF Policy field that identifies a link level QMF Policy for a corresponding link, where the MLD level QMF Policy indicates an AC for each MLD level QMF management frame and each link level QMF Policy field indicates the AC for each link level QMF management frame of the corresponding link, and a second wireless device configured to receive the management frame that includes the MLD level QMF Policy field and the link level QMF Policy field for each corresponding link, and operate according to the AC indicated by the first wireless device.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 4 depicts an example of a frame body of a QMF Policy frame that may be used to carry a QMF Policy and an additional QMF Policy in accordance with an embodiment of the invention.

FIG. 5 depicts an example of a frame body of a QMF Policy Change frame in accordance with an embodiment of the invention.

Throughout the description, similar reference numbers may be used to identify similar elements.

DETAILED DESCRIPTION

Figure 1:
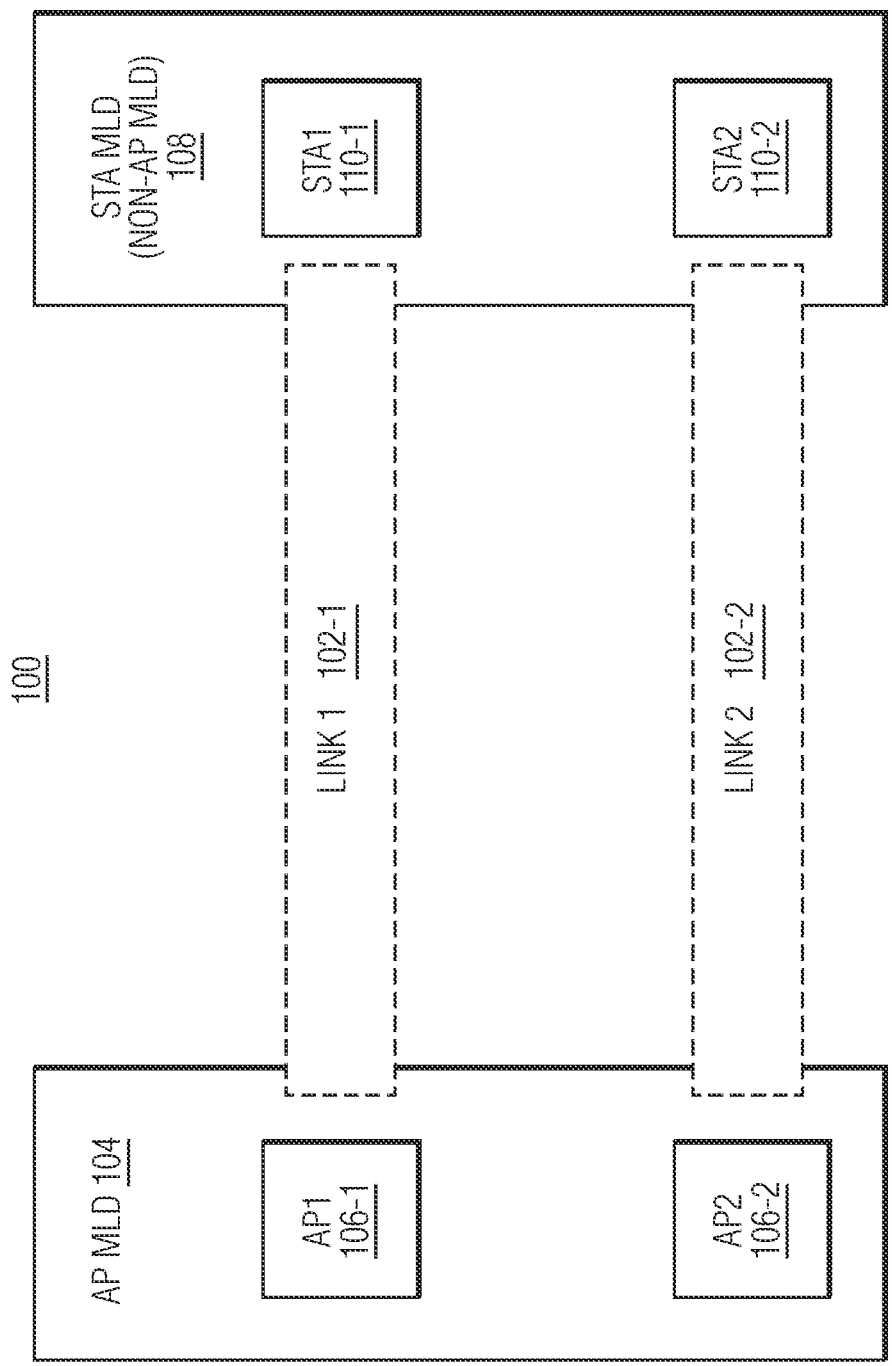
FIG. 1 depicts a multi-link communications system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a wireless communications system, a wireless device, e.g., an access point (AP) multi-link device (MLD) of a wireless local area network (WLAN) transmits data to at least one associated station (STA) MLD. The AP MLD is configured to operate with associated STA MLDs according to a communication protocol. For example, the communication protocol may be an Extremely High Throughput (EHT) communication protocol, or Institute of Electrical and Electronics Engineers (IEEE) 802.11be communication protocol. Features of wireless communications and multi-link communication systems operating in accordance with the EHT communication protocol and/or next-generation communication protocols may be referred to herein as "non-legacy" features. In some embodiments of the wireless communications system described herein, different associated STAs within range of an AP operating according to the EHT communication protocol are configured to operate according to at least one other communication protocol, which defines operation in a Basic Service Set (BSS) with the AP, but are generally affiliated with lower data throughput protocols. The lower data throughput communication protocols (e.g., High Efficiency (HE) communication protocol, Very High Throughput (VHT) communication protocol, etc.) may be collectively referred to herein as "legacy" communication protocols.

FIG. 1 depicts a multi-link communications system 100 that is used for wireless (e.g., WiFi) communications. In the embodiment depicted in FIG. 1, the multi-link communications system includes one AP multi-link device, which is implemented as AP MLD 104, and one non-AP STA multi-link device, which is implemented as STA MLD 108. The multi-link communications system can be used in various applications, such as industrial applications, medical applications, computer applications, and/or consumer or enterprise applications. In some embodiments, the multi-link communications system is a wireless communications system, such as a wireless communications system compatible with an IEEE 802.11 protocol. For example, the multi-link communications system may be a wireless communications system compatible with the IEEE 802.11be protocol. Although the depicted multi-link communications system 100 is shown in FIG. 1 with certain components and described with certain functionality herein, other embodiments of the multi-link communications system may include fewer or more components to implement the same, less, or more functionality. For example, in some embodiments, the multi-link communications system includes a single AP MLD with multiple STA MLDs, or multiple AP MLDs with more than one STA MLD. In another example, although the multi-link communications system is shown in FIG. 1 as being connected in a certain topology, the network topology of the multi-link communications system is not limited to the topology shown in FIG. 1. Although the system described with reference to FIG. 1 involves multi-link communications, the techniques described herein are also applicable to single-link communications. Furthermore, the techniques described herein may also be applicable to each link of a multi-link communications system.

In the embodiment depicted in FIG. 1, the AP MLD 104 includes two radios, implemented as access points (APs) 106-1 and 106-2. In such an embodiment, the APs may be AP1 106-1 and AP2 106-2. In some embodiments, a common part of the AP MLD 104 implements upper layer Media Access Control (MAC) functionalities (e.g., beacon acknowledgement establishment, reordering of frames, etc.) and a link specific part of the AP MLD 104, i.e., the APs 106-1 and 106-2, implement lower layer MAC functionalities (e.g., backoff, frame transmission, frame reception, etc.). The APs 106-1 and 106-2 may be implemented in hardware (e.g., circuits), software, firmware, or a combination thereof. The APs 106-1 and 106-2 may be fully or partially implemented as an integrated circuit (IC) device. In some embodiments, the APs 106-1 and 106-2 are wireless APs compatible with at least one WLAN communications protocol (e.g., at least one IEEE 802.11 protocol). For example, the APs 106-1 and 106-2 may be wireless APs compatible with the IEEE 802.11be protocol.

In some embodiments, an AP MLD (e.g., AP MLD 104) connects to a local area network (e.g., a LAN) and/or to a backbone network (e.g., the Internet) through a wired connection and wirelessly connects to wireless STAs, for example, through one or more WLAN communications protocols, such as the IEEE 802.11 protocol. In some embodiments, an AP (e.g., AP1 106-1 and/or AP2 106-2) includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller is implemented within a processor, such as a microcontroller, a host processor, a host, a digital signal processor (DSP), or a central processing unit (CPU), which can be integrated in a corresponding transceiver. In some embodiments, each of the APs 106-1 or 106-2 of the AP MLD 104 may operate in a different BSS operating channel. For example, AP1 106-1 may operate in a 320 MHz BSS operating channel at 6 GHz band and AP2 106-2 may operate in a 160 MHz BSS operating channel at 5 GHz band. Although the AP MLD 104 is shown in FIG. 1 as including two APs, other embodiments of the AP MLD 104 may include more than two APs.

In the embodiment depicted in FIG. 1, the non-AP STA multi-link device, implemented as STA MLD 108, includes two radios which are implemented as non-AP STAs 110-1 and 110-2. In such an embodiment, the non-AP STAs may be STA1 110-1 and STA2 110-2. The STAs 110-1 and 110-2 may be implemented in hardware (e.g., circuits), software, firmware, or a combination thereof. The STAs 110-1 and 110-2 may be fully or partially implemented as an IC device. In some embodiments, the non-AP STAs 110-1 and 110-2 are part of the STA MLD 108, such that the STA MLD is a communications device that wirelessly connects to a wireless AP MLD. For example, the STA MLD 108 may be implemented in a laptop, a desktop personal computer (PC), a mobile phone, or other communications device that supports at least one WLAN communications protocol. In some embodiments, the non-AP STA MLD 108 is a communications device compatible with at least one IEEE 802.11 protocol (e.g., the IEEE 802.11be protocol). In some embodiments, the STA MLD 108 implements a common MAC data service interface and the non-AP STAs 110-1 and 110-2 implement a lower layer MAC data service interface.

In some embodiments, the AP MLD 104 and/or the STA MLD 108 identifies which communication links support multi-link operation during a multi-link operation setup phase and/or exchanges information regarding multi-link capabilities during the multi-link operation setup phase. In some embodiments, each of the non-AP STAs 110-1 and 110-2 of the STA MLD 108 may operate in a different frequency band. For example, the non-AP STA 110-1 may operate in the 2.4 GHz frequency band and the non-AP STA 110-2 may operate in the 5 GHz frequency band. In some embodiments, each STA includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller is implemented within a processor, such as a microcontroller, a host processor, a host, a DSP, or a CPU, which can be integrated in a corresponding transceiver.

In the embodiment depicted in FIG. 1, the STA MLD 108 communicates with the AP MLD 104 via two communication links, e.g., link1 102-1 and link2 102-2. For example, each of the non-AP STAs 110-1 or 110-2 communicates with an AP 106-1 or 106-2 via corresponding communication links 102-1 or 102-2. In an embodiment, a communication link (e.g., link1 102-1 or link2 102-2) may include a BSS operating channel established by an AP (e.g., AP1 106-1 or AP2 106-2) that features multiple 20 MHz channels used to transmit frames (e.g., Physical Layer Protocol Data Units (PPDUs), beacons, management frames, etc.) between a first wireless device (e.g., an AP or an AP MLD) and a second wireless device (e.g., an STA or an STA MLD). In some embodiments, a 20 MHz channel may be a punctured 20 MHz channel or an unpunctured 20 MHz channel. Although the STA MLD 108 is shown in FIG. 1 as including two non-AP STAs, other embodiments of the STA MLD 108 may include one non-AP STA or more than two non-AP STAs. In addition, although the AP MLD 104 communicates (e.g., wirelessly communicates) with the STA MLD 108 via multiple links 102-1 and 102-2, in other embodiments, the AP MLD 104 may communicate (e.g., wirelessly communicate) with the STA MLD 108 via one link or more than two communication links.

A management frame that may be transmitted by a wireless device is described in further detail with reference to FIG. 2.

Figure 2:
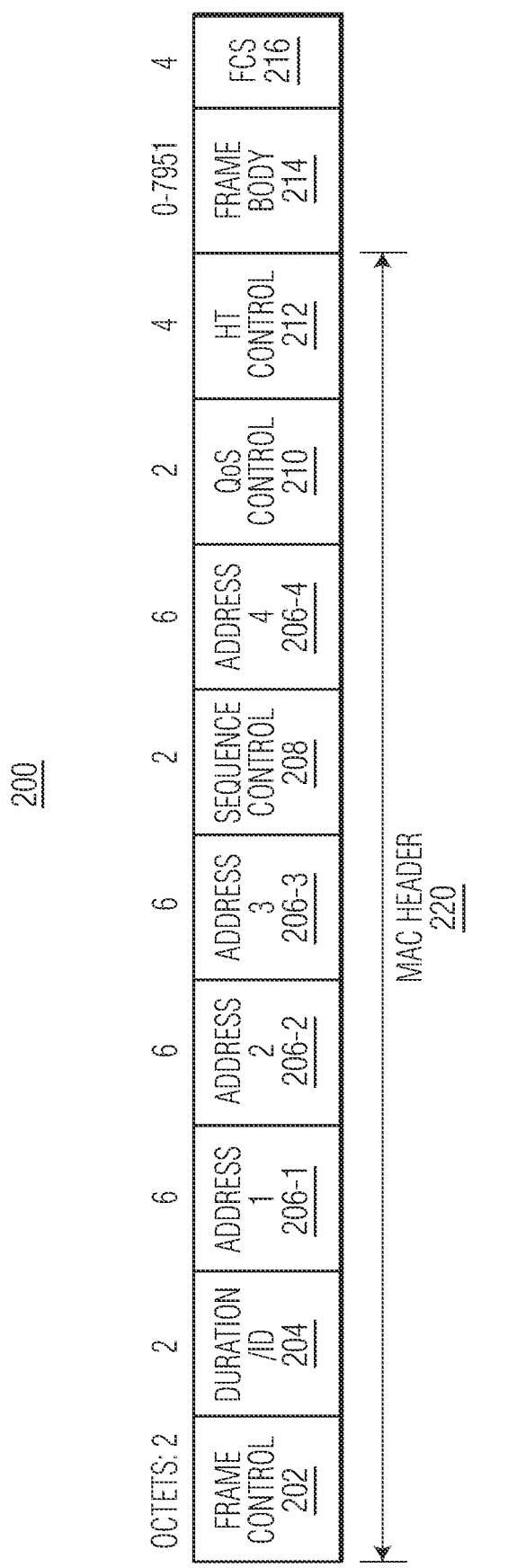
FIG. 2 depicts an example of a management frame that may be transmitted by a wireless device.

FIG. 2 depicts an example of a management frame, 200, that may be transmitted by a wireless device. With reference to FIG. 2, the management frame 200 is shown as including eleven fields, implemented as a first field, Frame Control 202 (2 octets), a second field, Duration/ID 204 (2 octets), a third field, Address 1 206-1 (6 octets), a fourth field, Address 2 206-2 (6 octets), a fifth field, Address 3 206-3 (6 octets), a sixth field, Sequence Control 208 (2 octets), a seventh field, Address 4 206-4 (6 octets), an eighth field, Quality of Service (QoS) Control 210 (2 octets), a ninth field, High-Throughput (HT) Control 212 (4 octets), a tenth field, Frame Body 214 (0-7951 octets), and an eleventh field, Frame Check Sequence (FCS) 216 (4 octets). In an embodiment, a MAC Header portion, 220, of the management frame 200 may include Frame Control 202, Duration/ID 204, Address 1 206-1, Address 2 206-2, Address 3 206-3, Sequence Control 208, Address 4 206-4, QoS Control 210, and HT Control 212.

In an embodiment, a multi-link operation may involve two wireless devices (e.g., AP MLD 104 and STA MLD 108) communicating with each other via the transmission and reception of management frames (e.g., management frame 200). In some embodiments, management frames may be transmitted at a link level between an AP (e.g., AP1 106-1 or AP2 106-2) of an AP MLD (e.g., AP MLD 104) and an STA (e.g., STA1 110-1 or STA2 110-2) of an STA MLD (e.g., STA MLD 108). As described herein, transmission at the "link level" may imply transmission and reception of frames (e.g., PPDUs, beacons, management frames, etc.) on one link (e.g., link1 102-1 or link2 102-2) between a corresponding AP of an AP MLD and a corresponding STA of an STA MLD. As an example, content of a "link level" management frame may be used by an AP of an AP MLD and/or an STA of an STA MLD. In some embodiments, management frames may be transmitted at an MLD level between an AP MLD (e.g., AP MLD 104) with multiple APs and an STA MLD (e.g., STA MLD 108) with multiple STAs. As described herein, transmission at the "MLD level" may imply transmission and reception of frames (e.g., PPDUs, beacons, management frames, etc.) on at least one link (e.g., link1 102-1, link2 102-2, or link1 102-1 and link2 102-2) between a corresponding AP MLD and a corresponding STA MLD. As an example, content of an "MLD level" management frame may be used by an AP MLD, affiliated APs of the AP MLD, an STA MLD, and affiliated STAs of the STA MLD.

In an embodiment, management frames transmitted in a multi-link operation between a first wireless device that supports QoS Management Frame (QMF) and a second wireless device that supports QMF may be QMF frames (e.g., unicast QMF frames) transmitted using a QMF service where different management frames have different access categories. In such an embodiment, a QMF Policy may indicate an Access Category (AC) (e.g., AC Best Effort (AC_BE), AC Background (AC_BK), AC Video (AC_VI), or AC Voice (AC_VO)) for different management frames, such that the AC may indicate operating parameters for wireless devices involved in the multi-link operation. In some embodiments, if the QMF Policy is not announced, then a default QMF Policy in accordance with an IEEE standard (e.g., the IEEE 802.11be standard, the IEEE 802.11ax standard, etc.) may be used. In an embodiment, transmitter sequence spaces of QMF frames may be defined in the format of <Address 1, AC>, such that "Address 1" identifies a MAC address of a wireless device that transmits a QMF frame and "AC" identifies an AC of the QMF Policy carried in the QMF frame. In an embodiment, receiver caches of QMF frames may be indexed in the format of <Address 2, AC, sequence number, fragment number>, such that "Address 2" identifies a MAC address of a wireless device that receives a QMF frame, "AC" identifies an AC of the QMF Policy carried in the QMF frame, "sequence number" identifies a sequence number of the QMF frame, and "fragment number" identifies a fragment number of the QMF frame (if the QMF frame is split into multiple fragments, e.g., as a MAC Management Protocol Data Unit (MMPDU)).

In accordance with an embodiment of the invention, a technique for wireless operations involves transmitting, by a first wireless device to a second wireless device, a management frame having an MLD level QMF Policy field that identifies an MLD level QMF Policy and a link level QMF Policy field that identifies a link level QMF Policy for a corresponding link, wherein the MLD level QMF Policy indicates an AC for each MLD level QMF management frame and each link level QMF Policy field indicates the AC for each link level QMF management frame of the corresponding link, receiving, at the second wireless device, the management frame that includes the MLD level QMF Policy field and the link level QMF Policy field for each corresponding link, and operating the second wireless device according to the AC indicated by the first wireless device.

In some embodiments, when the link level QMF Policy is used as a link level policy, the first wireless device may be an AP of an AP MLD (or an STA of an STA MLD) and the second wireless device may be an STA of an STA MLD (or an AP of an AP MLD). In such an embodiment, the first wireless device may use the link level QMF Policy to transmit the link level QMF management frames by using different ACs defined in the link level QMF Policy and the second wireless device may use the link level QMF Policy to receive the link level QMF management frames by using different ACs defined in the link level QMF Policy. In some embodiments, when the MLD level QMF Policy is used as an MLD level policy, the first wireless device may be an AP MLD with multiple APs (or an STA MLD with multiple STAs) and the second wireless device may be an STA MLD with multiple STAs (or an AP MLD with multiple APs). In such an embodiment, the first wireless device may use the MLD level QMF Policy to transmit MLD level QMF management frames by using different ACs defined in the MLD level QMF Policy and the second wireless device may use the MLD level QMF Policy to receive QMF management frames by using different ACs defined in the MLD level QMF Policy. In such embodiments, when link level management frames are transmitted in links for which the link level management frames carry information, the link level QMF Policy and the MLD level QMF Policy may be separately defined.

According to a first multi-link operation technique, link level management frames (e.g., link level QMF management frames) and MLD level management frames (e.g., MLD level QMF management frames) may be transmitted per a link level QMF Policy and per an MLD level QMF Policy, respectively. In an embodiment, a QMF Policy may indicate an AC that may be used for a management frame, such that a wireless device (e.g., first wireless device and/or second wireless device) may transmit the management frame according to the indicated AC by the QMF Policy. In some embodiments, at a transmitting MLD (e.g., first wireless device), a sequence number space for each AC of management frames at a per-link level (e.g., link level QMF management frames) and a sequence number space for each AC of management frames at an MLD level (e.g., MLD level QMF management frames) may be separately maintained. In such an embodiment, the per-link level management frames of each AC and the MLD level management frames of each AC may be separately maintained by separating a receive cache of management frames of each AC at the per-link level and a receive cache of management frames of each AC at the MLD level.

According to the first multi-link operation technique, in some embodiments, a first wireless device (e.g., an AP MLD with multiple APs) may define an MLD level QMF Policy that may be used as an MLD level policy and a link level QMF Policy that may be used as a link level policy for each link, such that the first wireless device may announce the QMF Policies via a management frame (e.g., Beacon frame). In such an embodiment, the MLD level QMF Policy and the link level QMF Policy may be applied to management frames addressed to the first wireless device (e.g., the AP MLD) and addressed to each AP of the first wireless device, respectively. In such an embodiment, the MLD level QMF Policy and the link level QMF Policy may be applied to management frames transmitted by the first wireless device (e.g., AP MLD) to a second wireless device, e.g., an STA MLD, and may be addressed to each STA of the STA MLD, respectively. In some embodiments, according to the first multi-link operation technique, a transmitting MLD (e.g., first wireless device) may allocate a sequence number for each MLD level unicast management frame (e.g., MLD level unicast QMF frame) of an AC from an MLD level transmit sequence number space defined by <peer MLD MAC address, AC>. In such an embodiment, "peer MLD MAC address" identifies a MAC address of another wireless device (e.g., AP MLD or STA MLD) associated with the first wireless device and "AC" identifies an AC of the QMF Policy carried in the unicast management frame (e.g., the unicast QMF frame).

In some embodiments, according to the first multi-link operation technique, a transmitting STA or a transmitting AP of the transmitting MLD (e.g., transmitting STA MLD or transmitting AP MLD) may allocate a sequence number for each link level unicast management frame (e.g., link level unicast QMF frame) of an AC from a link level transmit sequence number space identified by <peer AP/STA MAC address, AC>. In such an embodiment, "peer AP/STA MAC address" identifies a MAC address of a receiving AP or a receiving STA (e.g., AP of AP MLD or STA of STA MLD) associated with a receiving MLD (e.g., second wireless device) and "AC" identifies an AC of the QMF Policy carried in the unicast management frame (e.g., the unicast QMF frame).

In some embodiments, according to the first multi-link operation technique, receiving MLD (e.g., receiving STA MLD or a receiving AP MLD) caches of unicast MLD level management frames (e.g., unicast MLD level QMF frames) of an AC may be indexed in the format of <peer MLD MAC address, AC, sequence number, fragment number>. In such an embodiment, "peer MLD MAC address" identifies a MAC address of another wireless device (e.g., transmitting AP MLD or transmitting STA MLD), "AC" identifies an AC of the QMF Policy carried in a QMF frame, "sequence number" identifies a sequence number of an MLD level QMF frame, and "fragment number" identifies a fragment number of the QMF frame (if the QMF frame is split into multiple fragments, e.g., as an MMPDU).

In some embodiments, according to the first multi-link operation technique, for a receiving STA or a receiving AP of a receiving MLD (e.g., receiving STA MLD or receiving AP MLD), caches of unicast link level management frames (e.g., unicast link level QMF frames) of an AC may be indexed in the format of <peer AP/STA MAC address, AC, sequence number, fragment number>. In such an embodiment, "peer AP/STA MAC address" identifies a MAC address of a transmitting AP or a transmitting STA of a transmitting MLD, "AC" identifies an AC of the QMF Policy carried in a QMF frame, "sequence number" identifies a sequence number of a link level QMF frame, and "fragment number" identifies a fragment number of the QMF frame (if the QMF frame is split into multiple fragments, e.g., as an MMPDU).

According to the second multi-link operation technique, a first wireless device may transmit to a second wireless device, a management frame having a QMF Policy field that may be applied to both MLD level management frames and link level management frames, such that the QMF Policy may indicate an AC for each QMF management frame (e.g., the MLD level management frames and the link level management frames). In some embodiments, for the QMF Policy, the first wireless device that uses the QMF Policy to transmit the link level QMF management frames and the MLD level QMF management frames by using different ACs defined in the policy may be an AP MLD (or an STA MLD) and the second wireless device that uses the QMF Policy to receive the link level QMF management frames and the MLD level QMF management frames by using different ACs defined in the policy may be an STA MLD (or an AP MLD).

In one embodiment, according to the second multi-link operation technique, when transmitting a unicast management frame of an AC (e.g., unicast MLD level QMF frames or unicast link level QMF frames), the first wireless device (e.g., AP MLD or STA MLD) may allocate a new sequence number sequentially from transmit sequence number spaces identified by <MLD address of peer MLD, AC>. In such an embodiment, "MLD address of peer MLD" identifies the MAC address of a receiving MLD and "AC" identifies an AC of the unicast management frame (e.g., the unicast QMF frame) defined by the QMF Policy. In such embodiment, a transmitting MLD may maintain one sequence number space for the unicast MLD level QMF management frames and the unicast link level QMF management frames of one AC transmitted to a receiving MLD at MLD level. In one embodiment, an MLD can select any link to transmit a link level QMF management frame for one link.

In one embodiment, according to the second multi-link operation technique, a second wireless device (e.g., receiving MLD) may maintain a receiver cache of received unicast management frames (e.g., MLD level QMF management frames and/or link level QMF management frames) of one AC addressed to the second wireless device from a first wireless device (e.g., transmitting MLD) where the receiver cache may be recorded in the format of <MLD address of peer MLD, AC, sequence number, fragment number> to identify the latest received management frame from the second MLD. In such an embodiment, "MLD address of peer MLD" identifies the MLD address of a peer transmitting MLD (second MLD), "AC" identifies an AC of a QMF management frame Policy carried in the QMF frame, "sequence number" identifies a sequence number of the most recently received QMF frame with the newest sequence number of the AC, and "fragment number" identifies a fragment number of the most recently received QMF frame (if the QMF frame is split into multiple fragments, e.g., as an MMPDU) with the newest fragment number of the AC.

As an example, the receiver cache may be recorded in the format of <MLD address of peer MLD, AC, sequence number, fragment number> to identify the latest received management frame from the second MLD for duplicate detection.

In some embodiments, for duplicate detection, if a sequence number and a fragment number of a received QMF frame (e.g., MLD level QMF management frame and/or link level QMF management frame) of the AC are less than a recorded sequence number and a recorded fragment number of the AC from a transmitting MLD (e.g., first wireless device) in the receiver cache, then the received QMF frame may be discarded. In some embodiments, for duplicate detection, if the sequence number and the fragment number of the received QMF frame (e.g., MLD level QMF management frame and/or link level QMF management frame) of the AC are more than the recorded sequence number and the recorded fragment number (respectively) of the AC from the transmitting MLD (e.g., first wireless device) in the receiver cache, then the received QMF frame may be accepted. In such an embodiment, the receiver cache may be replaced by the sequence number and the fragment number of the received QMF frame.

In some embodiments, for duplicate detection, if the sequence number of the received QMF frame (e.g., MLD level QMF management frame and/or link level QMF management frame) of the AC is the same as the recorded sequence number of the AC from the transmitting MLD (e.g., first wireless device) in the receiver cache and the recorded fragment number of the received QMF frame of the AC is more than the recorded fragment number (respectively) of the AC from the transmitting MLD in the receiver cache, then the received QMF frame may be accepted. In such an embodiment, the receiver cache may be replaced by the sequence number and the fragment number of the received QMF frame. In some embodiments, for duplicate detection, if the sequence number of the received QMF frame (e.g., MLD level QMF management frame and/or link level QMF management frame) of the AC is more than the recorded sequence number of the AC from the transmitting MLD in the receiver cache and the fragment number of the received QMF frame of the AC is the same as the recorded fragment number (respectively) of the AC from the transmitting MLD (e.g., first wireless device) in the receiver cache, then the received QMF frame may be accepted. In such an embodiment, the receiver cache may be replaced by the sequence number and the fragment number of the received QMF frame. In such embodiments, the received QMF management frames from the transmitting MLD may be discarded if the previously described criteria is not met.

A multi-link (ML) element that may be used to carry a QMF Policy is described in further detail with reference to FIG. 3.

Figure 3:
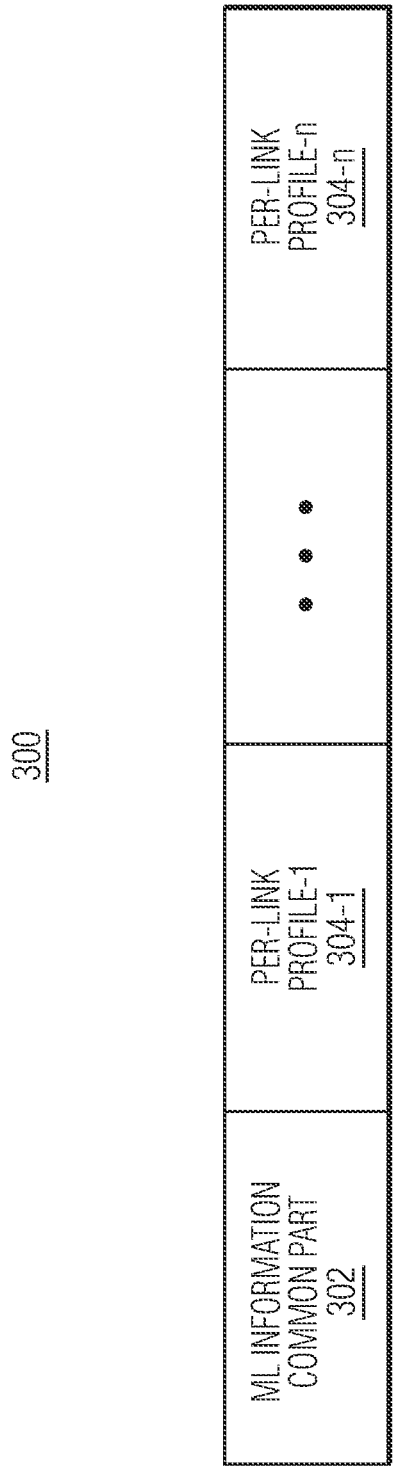
FIG. 3 depicts an example of a multi-link (ML) element that may be used to carry a Quality of Service (QoS) Management Frame (QMF) Policy in accordance with an embodiment of the invention.

FIG. 3 depicts an example of an ML element, 300, that may be used to carry a QMF Policy (not shown) in accordance with an embodiment of the invention. With reference to FIG. 3, the ML element 300 is shown as including two or more sub-elements, implemented as a first sub-element, ML Information Common part 302, a second sub-element, Per-Link Profile-1 304-1, and subsequent sub-element(s), Per-Link Profile-n 304-n, such that "n" may be an integer greater than one. In an embodiment, a Per-Link Profile (e.g., Per-Link Profile-1 304-1 and/or Per-Link Profile-n 304-n) may include capability information or operating parameter information for a corresponding link used by a first wireless device and a second wireless device. For example, Per-Link Profile-1 304-1 may include capability information or operating parameter information for a first link and Per-Link Profile-n 304-n may include capability information or operating parameter information for an n-th link, where multiple Per-Link Profiles for multiple links may be in between the Per-Link Profile-1 304-1 and the Per-Link Profile-n 304-n.

With reference to FIG. 3, the ML element 300 may be used to carry a QMF Policy in a management frame (e.g., Probe Response frame, Association Response frame, beacon, etc.) transmitted by a wireless device (e.g., AP MLD). In some embodiments, when an AP MLD announces a QMF Policy used for MLD level management frames and link level management frames, the QMF Policy used for the MLD level may be carried in the ML Information Common part 302 of the ML element 300. In some embodiments, when an AP MLD separately announces a QMF Policy used for MLD level management frames and link level management frames, the QMF Policy for a reported link may be carried in a Per-Link Profile (e.g., Per-Link Profile-1 304-1 and/or Per-Link Profile-n 304-n) of the reported link in the ML element 300. As an example, when the management frame that carries the QMF Policy for MLD level management frames and the QMF Policy for the link level management frames of a second link (e.g., link2) is transmitted using a first link (e.g., link1), link2 may be a reported link and link1 may be the reporting link.

A QMF Policy frame that may be used to carry a QMF Policy is described in further detail with reference to FIG. 4.

FIG. 4 depicts an example of a frame body of a QMF Policy frame, 400, that may be used to carry a QMF Policy and an additional QMF Policy in accordance with an embodiment of the invention. With reference to FIG. 4, the frame body of the QMF Policy frame 400 is shown as including four or more fields (e.g., QMF Policy frame Action field contents), implemented as a first field, Category 402 (1 octet), a second field, Public Action 404 (1 octet), a third field, Dialog Token 406 (1 octet), a fourth field, Status Code 408 (2 octets), an optional fifth field, QMF Policy element 410 (0 or 3-257 octets), and an optional sixth field, ML element 412. In an embodiment, the ML element 412 may be the ML element 300 as shown in FIG. 3. In some embodiments, the QMF Policy frame 400 may be a management frame transmitted by a first wireless device to a second wireless device. In some embodiments, when one QMF Policy is used for both MLD level management frames and link level management frames, the ML element 412 may not be carried. In some embodiments, when different QMF Policies are separately used for MLD level management frames and link level management frames, the ML element 412 may be carried.

With reference to FIG. 4, QMF Policies may be identified by the QMF Policy element 410 and the optional ML element 412 included in the QMF Policy frame 400, such that the QMF Policies indicate ACs for various QMF management frames and may be used as an MLD level policy and/or as a link level policy.

A QMF Policy Change frame that may be used to update a QMF Policy is described in further detail with reference to FIG. 5.

FIG. 5 depicts an example of a frame body of a QMF Policy Change frame, 500, in accordance with an embodiment of the invention. In an embodiment, the QMF Policy Change frame 500 may be used by a first wireless device (e.g., requesting MLD) to request a change of QMF Policies from a second wireless device (e.g., receiving MLD). With reference to FIG. 5, the frame body of the QMF Policy Change frame 500 is shown as including four or more fields (e.g., QMF Policy Change frame Action field contents), implemented as a first field, Category 502 (1 octet), a second field, Public Action 504 (1 octet), a third field, Dialog Token 506 (1 octet), a fourth field, QMF Policy element 510 (3-257 octets), and an optional fifth field, ML element 512. In an embodiment, the ML element 512 may be the ML element 300 as shown in FIG. 3. In some embodiments, QMF Policies in the QMF Policy element 510 and the ML element 512 may be the policies that have been most recently received from the second wireless device.

In some embodiments, a protected management frame (PMF) or a robust management frame may need to be protected. In such an embodiment, a Pairwise Transient Key (PTK) that may be derived from a Pairwise Master Key (PMK) may be used for encrypting/decrypting unicast management frames. In some embodiments, a replay counter may be applied to each management frame when at least one of the wireless devices (e.g., first wireless device and/or second wireless device) does not support QMF, such that the replay counter may use a packet number (PN) during the transmission and reception of unicast management frames. As an example, a PN may be a value from 0 to a maximal allowed value (PN space). In such an embodiment, a transmitting MLD (e.g., first wireless device) may acquire a new PN value for each new MLD level robust management frame or link level robust management frame transmitted to a receiving MLD (increasing by one compared with the previous used PN value) from one PN space for the receiving MLD (e.g., second wireless device). In another embodiment, a receiving MLD (e.g., first wireless device) may record a received newest PN value at an MLD level for each new received MLD level robust management frame or link level robust management frame from a transmitting MLD (e.g., second wireless device), and may decide whether a received robust unicast management frame from the transmitting MLD should be discarded. In one embodiment, if the PN of the received robust unicast frame from the transmitting MLD is no more than the recorded PN of the transmitting MLD, the received robust unicast frame may be discarded.

In some embodiments, when QMF is supported by a first wireless device (e.g., transmitting MLD) and a second wireless device (e.g., receiving MLD), and one QMF Policy may be applied to both MLD level management frames and link level management frames, a robust QMF management frame may indicate an AC that includes an Access Category Index (ACI), such that for each ACI, a replay counter space (e.g., PN space) may be applied to robust QMF management frames for each AC (e.g., robust management frame). In some embodiments, for each ACI, a separate replay counter space may be applied to robust unicast management frames (e.g., unicast MLD level management frames and unicast link level management frames) transmitted by a first wireless device to a second wireless device (e.g., peer MLD), e.g., from an AP MLD to a non-AP STA MLD, from a non-AP STA MLD to an AP MLD, from a non-AP STA MLD to a non-AP STA MLD, or from an AP MLD to an AP MLD. In some embodiments, for each ACI, a transmitting MLD (e.g., first wireless device) may acquire a new PN value for each new MLD level robust management frame or link level robust management frame of the ACI to a receiving MLD (increasing by one compared with the previous used PN value) from one PN space for the receiving MLD (e.g., second wireless device).

In some embodiments, when QMF is supported by both a transmitting MLD (e.g., first wireless device) and a receiving MLD (e.g., second wireless device), and one QMF Policy may be applied to both MLD level management frames and link level management frames, for each ACI, a receiving MLD (e.g., second wireless device) may maintain a single replay counter of the ACI for received robust unicast management frames of the ACI (e.g., unicast robust management frames) at an MLD level and a link level from the transmitting MLD (e.g., first wireless device). In some embodiments, the receiving MLD may use a PN value carried in a received management frame from the transmitting MLD to detect replays. In such an embodiment, the second wireless device may discard a management frame of an ACI from the transmitting MLD with a PN value that may be less than or equal to the recorded PN value of the ACI from the transmitting MLD (indexed by the MAC address of the transmitting MLD and ACI). In such an embodiment, the second wireless device may record the PN value of the ACI in the received robust management frame with the ACI value (indexed by the MAC address of the transmitting MLD and ACI) from the transmitting MLD if the received robust management frame is accepted.

In some embodiments, when QMF is supported by both a transmitting MLD (e.g., first wireless device) and a receiving MLD (e.g., second wireless device), and QMF Policies for MLD level management frames and link level management frames are different, a robust QMF management frame may indicate an AC that includes an ACI, such that for each ACI of MLD level management frames, a replay counter space (PN space) at the MLD level may be applied to the robust QMF management frames for the AC (e.g., robust management frame), and for each ACI of link level management frames of each link, a replay counter space (PN space) at the MLD level of the link may be applied to the robust QMF management frames for the AC (e.g., robust management frame) of the link.

In some embodiments, for each ACI, a separate replay counter may be applied to management frames (e.g., unicast management frames) at a per-link level for each link between a first wireless device (e.g., APs of an AP MLD or STAs of an STA MLD) and a second wireless device (peer MLD) (e.g., APs of an AP MLD or STAs of an STA MLD). In some embodiments, the first wireless device may not reorder frames within a replay counter of management frames at the per-link level, such that management frames may be transmitted on one link. In some embodiments, for each ACI, the second wireless device may maintain a single replay counter for management frames received at the per-link level and may use a PN from received management frames to detect replays. In such an embodiment, for each ACI, the second wireless device may discard management frames with a PN that is less than or equal to the replay counter of management frames at the per-link level. In some embodiments, there may be a separate replay counter for each link.

Figure 6:
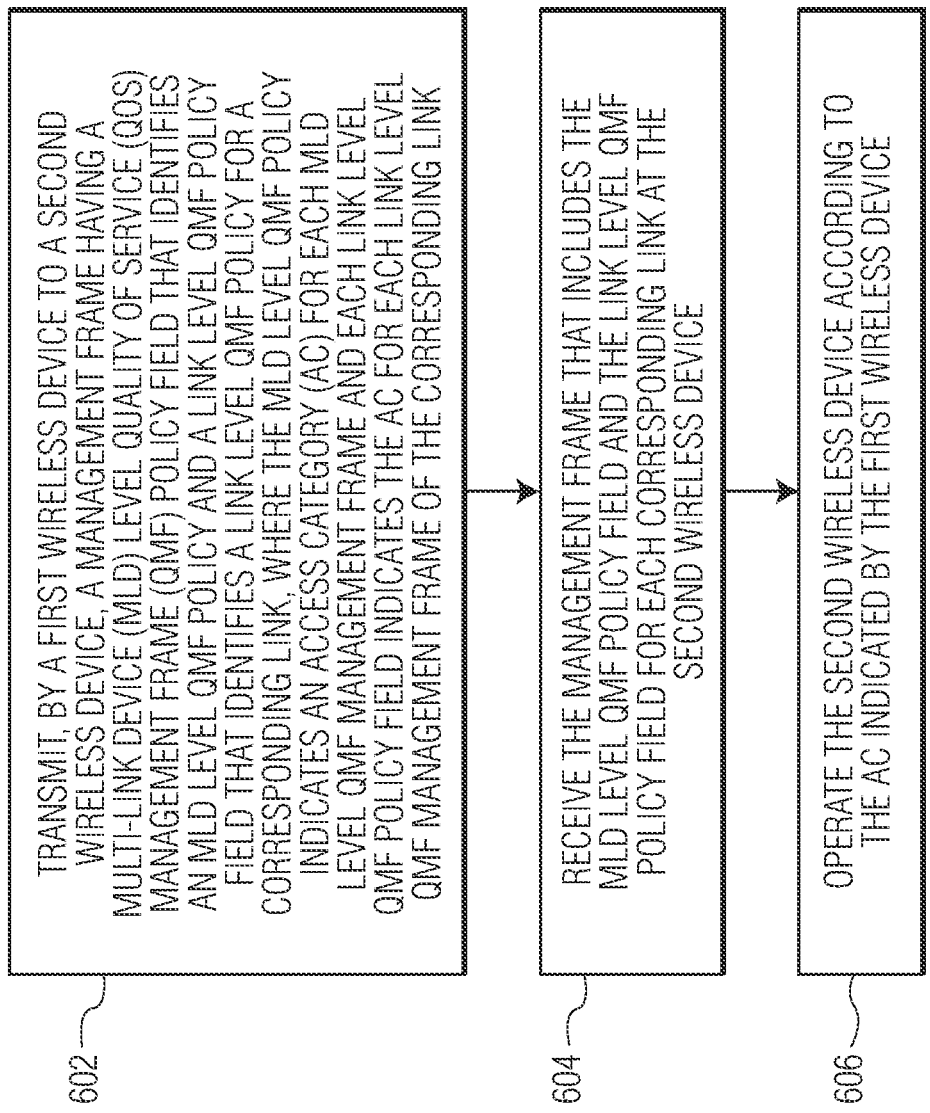
FIG. 6 illustrates a flow diagram of a technique for wireless operations in accordance with an embodiment of the invention.

FIG. 6 illustrates a flow diagram of a technique for wireless operations in accordance with an embodiment of the invention. At block 602, a first wireless device may transmit to a second wireless device, a management frame having an MLD level QMF Policy field that identifies an MLD level QMF Policy and a link level QMF Policy field that identifies a link level QMF Policy for a corresponding link, where the MLD level QMF Policy indicates an AC for each MLD level QMF management frame and each link level QMF Policy field indicates the AC for each link level QMF management frame of the corresponding link. At block 604, the second wireless device may receive the management frame that includes the MLD level QMF Policy field and the link level QMF Policy field for each corresponding link. At block 606, the second wireless device may operate according to the AC indicated by the first wireless device.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for wireless operations, the method comprising:

transmitting, by a first wireless device to a second wireless device, a management frame having a multi-link device (MLD) level Quality of Service (QoS) Management Frame (QMF) Policy field that identifies an MLD level QMF Policy and a link level QMF Policy field that identifies a link level QMF Policy for a corresponding link, wherein the MLD level QMF Policy indicates an Access Category (AC) for each MLD level QMF management frame and each link level QMF Policy field indicates the AC for each link level QMF management frame of the corresponding link;

receiving, at the second wireless device, the management frame that includes the MLD level QMF Policy field and the link level QMF Policy field for each corresponding link; and operating the second wireless device according to the AC indicated by the first wireless device;

wherein a sequence number space included in the link level QMF management frame and the MLD level QMF management frame for different ACs are sequentially allocated by the first wireless device;

wherein the first wireless device maintains one sequence number space for the MLD level QMF management frame and the link level QMF management frame of one AC transmitted to the second wireless device at the MLD level;

wherein the second wireless device maintains a receiver cache of the MLD level QMF management frame and the link level QMF management frame transmitted by the first wireless device;

wherein the receiver cache is used for duplicate detection; and wherein during the duplicate detection, if a sequence number and a fragment number of at least one of the MLD level QMF management frame and the link level QMF management frame are less than a recorded sequence number and a recorded fragment number of the AC from the first wireless device in the receiver cache, then at least one of the MLD level QMF management frame and the link level QMF management frame is discarded.

2. The method of claim 1, wherein when the link level QMF Policy is used as a link level policy, the first wireless device is an access point (AP) of an AP MLD and the second wireless device is a station (STA) of an STA MLD.

3. The method of claim 1, wherein when the MLD level QMF Policy is used as an MLD level policy, the first wireless device is an AP MLD with multiple APs and the second wireless device is an STA MLD with multiple STAs.

4. The method of claim 1, wherein a sequence number space for each AC of the link level QMF management frame and a sequence number space for each AC of the MLD level QMF management frame are separately maintained.

5. The method of claim 4, wherein the link level QMF management frame and the MLD level QMF management frame are separately maintained by separating a receive cache of the link level QMF management frame and a receive cache of the MLD level QMF management frame.

6. The method of claim 1, wherein during the duplicate detection, if a sequence number and a fragment number of at least one of the MLD level QMF management frame and the link level QMF management frame are more than a recorded sequence number and a recorded fragment number of the AC from the first wireless device in the receiver cache, then at least one of the MLD level QMF management frame and the link level QMF management frame is accepted.

7. The method of claim 1,
wherein during the duplicate detection, if a sequence number and a fragment number of at least one of the MLD level QMF management frame and the link level QMF management frame of the AC is the same as a recorded sequence number of the AC from the first wireless in the receiver cache and a recorded fragment number of the MLD level QMF management frame and the link level QMF management frame of the AC is more than a recorded fragment number of the AC from the first wireless device in the receiver cache, then at least one of the MLD level QMF management frame and the link level QMF management frame is accepted.

8. The method of claim 1,
wherein during the duplicate detection, if a sequence number and a fragment number of at least one of the MLD level QMF management frame and the link level QMF management frame of the AC is more than a recorded sequence number of the AC from the first wireless device in the receiver cache and a fragment number of the MLD level QMF management frame and the link level QMF management frame of the AC is the same as a recorded fragment number of the AC from the first wireless device in the receiver cache, then at least one of the MLD level QMF management frame and the link level QMF management frame is accepted.

9. The method of claim 1,
wherein the indicated AC includes an Access Category Index (ACI); and
wherein for each ACI, a replay counter of the link level QMF management frame and a replay counter of the MLD level QMF management frame are separately maintained.

10. The method of claim 9,
wherein for each ACI, the first wireless device does not reorder management frames within the replay counter of the MLD level QMF management frame.

11. The method of claim 9,
wherein for each ACI, the second wireless device discards management frames with a packet number (PN) that is at least one of less than and equal to the replay counter of the MLD level QMF management frame.

12. The method of claim 9,
wherein for each ACI, the first wireless device does not reorder management frames within the replay counter of the link level QMF management frame.

13. The method of claim 9,
wherein for each ACI, the second wireless device discards management frames with a PN that is at least one of less than and equal to the replay counter of the link level QMF management frame.

14. A wireless system, the wireless system comprising:
a first wireless device configured to:
transmit a management frame having
a multi-link device (MLD) level Quality of Service (QoS) Management Frame (QMF) Policy field that identifies an MLD level QMF Policy and
a link level QMF Policy field that identifies a link level QMF Policy for a corresponding link,
wherein
the MLD level QMF Policy indicates an Access Category (AC) for each MLD level QMF management frame and
each link level QMF Policy field indicates the AC for each link level QMF management frame of the corresponding link; and
a second wireless device configured to:
receive the management frame that includes the MLD level QMF Policy field and the link level QMF Policy field for each corresponding link; and
operate according to the AC indicated by the first wireless device;
wherein the indicated AC includes an Access Category Index (ACI);
wherein for each ACI, a replay counter of the link level QMF management frame and a replay counter of the MLD level QMF management frame are separately maintained; and
wherein for each ACI, the first wireless device does not reorder management frames within the replay counter of the MLD level QMF management frame.

15. A wireless system, the wireless system comprising:
a first wireless device configured to:
transmit a management frame having
a multi-link device (MLD) level Quality of Service (QoS) Management Frame (QMF) Policy field that identifies an MLD level QMF Policy and
a link level QMF Policy field that identifies a link level QMF Policy for a corresponding link,
wherein
the MLD level QMF Policy indicates an Access Category (AC) for each MLD level QMF management frame and
each link level QMF Policy field indicates the AC for each link level QMF management frame of the corresponding link; and
a second wireless device configured to:
receive the management frame that includes the MLD level QMF Policy field and the link level QMF Policy field for each corresponding link; and
operate according to the AC indicated by the first wireless device;
wherein the indicated AC includes an Access Category Index (ACI);
wherein for each ACI, a replay counter of the link level QMF management frame and a replay counter of the MLD level QMF management frame are separately maintained; and
wherein for each ACI, the first wireless device does not reorder management frames within the replay counter of the link level QMF management frame.

16. A method for wireless operations, the method comprising:
transmitting, by a first wireless device to a second wireless device,
a management frame having a multi-link device (MLD) level Quality of Service (QoS) Management Frame (QMF) Policy field that identifies an MLD level QMF Policy and
a link level QMF Policy field that identifies a link level QMF Policy for a corresponding link,
wherein
the MLD level QMF Policy indicates an Access Category (AC) for each MLD level QMF management frame and
each link level QMF Policy field indicates the AC for each link level QMF management frame of the corresponding link;
receiving, at the second wireless device, the management frame that includes the MLD level QMF Policy field and the link level QMF Policy field for each corresponding link; and operating the second wireless device according to the AC indicated by the first wireless device;

wherein a sequence number space included in the link level QMF management frame and the MLD level QMF management frame for different ACs are sequentially allocated by the first wireless device;

wherein the first wireless device maintains one sequence number space for the MLD level QMF management frame and the link level QMF management frame of one AC transmitted to the second wireless device at the MLD level;

wherein the second wireless device maintains a receiver cache of the MLD level QMF management frame and the link level QMF management frame transmitted by the first wireless device;

wherein the receiver cache is used for duplicate detection; and wherein during the duplicate detection, if a sequence number and a fragment number of at least one of the MLD level QMF management frame and the link level QMF management frame are more than a recorded sequence number and a recorded fragment number of the AC from the first wireless device in the receiver cache, then at least one of the MLD level QMF management frame and the link level QMF management frame is accepted.

\* \* \* \* \*